UNITED STATES PATENT OFFICE 2,406,594

TERTIARY AMINES OF HETEROCYCLIC COMPOUNDS

Carl Djerassi, Madison, Wis., and Charles P. Huttrer and Caesar R. Scholz, Summit, N. J., assignors to Ciba Pharmaceutical Products Incorporated, Summit, N. J., a corporation of New Jersey No Drawing. Application December 23, 1943, Serial No. 515,424

2 Claims. (Cl. 260—296)

The present invention relates to new tertiary amines of heterocyclic compounds, and more particularly to tertiary amines of the formula $$R_1-N(R_2)-R_3-N(R_4)(R_5)$$

in which $R_1$ designates a mononuclear heterocyclic radical (for instance: pyridine, pyrimidine, etc. radical) which may be substituted by one or several hydroxy or substituted hydroxy, alkyl or aralkyl groups; $R_2$ stands for alkyl (for instance: methyl, ethyl, n- or iso-propyl), aralkyl (for instance: benzyl, α-methyl-naphthyl), aryl (for instance: phenyl), or a heterocyclic radical (for instance: the pyridine or piperidine radical), all of which may be substituted by one or several hydroxy, amino, substituted amino or alkyl groups; $R_3$ stands for a straight or branched chain alkylene group, the carbon atom chain of which may contain 2–5 carbon atoms; $R_4$ and $R_5$ each stands for hydrogen or alkyl, at least one being alkyl, or for the carbon chain of a heterocyclic radical in which case the outermost N will be part of the ring, thus:

$$-R_3-N\begin{pmatrix}CH_2-CH_2\\CH_2-CH_2\end{pmatrix}CH_2$$

These compounds can be obtained, for instance by heating a suitable heterocyclic amino or polyamino compound (which may be substituted as mentioned above) with a dialkylamino alkyl halide compound. The substituent $R_2$ may be subsequently introduced by another condensation of the same kind (see Example 1, Type A).

The new compounds are likewise obtainable by causing a suitable halogenated heterocyclic compound to act upon an asymmetrically (tri) substituted alkylenediamine compound (see Example 2, Type C).

Alternatively it is possible to react the heterocyclic amino compound or the halogenated heterocyclic compound first with the substituent $R_2$ and subsequently with the dialkylamino alkyl halide (see Example 1, Type B).

In these processes it is advantageous to add an acid binding agent and to use a solvent.

The new compounds are useful for therapeutic application, many possessing marked anti-histaminic properties. The presently-preferred compounds, to which the appended claims are directed, are those wherein the substituent $R_2$ is aralkyl, $R_3$ is —$CH_2.CH_2$—, and $R_4$ and $R_5$ are alkyl.

The following examples serve to illustrate the invention without limiting it thereto, all parts being by weight.

EXAMPLE 1

(Type A)

30 g. α-aminopyridine and 5.9 g. sodamide, suspended in 350 cc. dry toluene, are heated to 90° C.; 16 g. dimethylaminoethyl chloride are added, and the mixture refluxed for 16 hours. After acidification, the toluene is driven off by steam distillation; the liquid is made alkaline and extracted with ether or chloroform; the latter driven off, and the residue distilled in vacuo. The fraction boiling at 135–150° C./19 mm. is a yellowish oil of the formula:

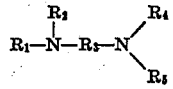

5.32 g. of this oil are dissolved in 40 cc. toluene, 1.28 g. sodamide are added and heated to 80° C., then 5 cc. benzylchloride are slowly added drop by drop, and refluxed for 6 hours. The mixture is worked up as mentioned above. The fraction of boiling point 193–205° C./20 mm. is a yellow thick oil of the formula:

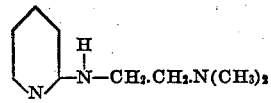

The di-hydrochloride of the base can be prepared by dissolving the latter in ethyl acetate and passing gaseous hydrogen chloride into the solution. The salt precipitates as colorless crystals which are hygroscopic.

The corresponding γ-pyridine compound of the following formula:

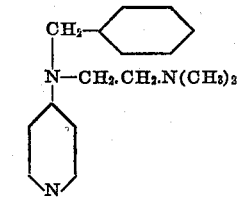

may be obtained in similar manner by conducting the reaction with γ-aminopyridine instead of α-aminopyridine.

(Type B)

1.98 g. α-benzylamino pyridine-hydrochloride and 1.44 g. dimethylaminoethylchloride-hydrochloride are suspended in 40 cc. dry toluene, and 0.78 g. sodamide are added. After refluxing 21 hours, the mixture is worked up as mentioned above. The same oil of B. P. 193–205° C./20 mm. results.

EXAMPLE 2

(Type C)

19.2 g. N,N-diethyl N'-phenyl-ethylenediamine of B. P. 148–159° C./16 mm. and 3.9 g. sodamide were suspended in 200 cc. dry toluene. After heating to 90° C., 15.8 g. of α-bromopyridine were added, and the mixture refluxed for 20 hours. Then it was worked up as mentioned in Example 1. A yellow oil of B. P. 135–149° C./0.08 mm. was obtained, corresponding to the formula:

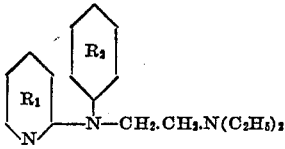

The di-hydrochloride may be prepared from an ether solution, from which it precipitates as white crystals.

Corresponding compounds, substituted with amino (—NH₂) or hydroxy (—OH) in the para-position of R₂ can be obtained by using p-chloro-aniline or p-chlorphenol instead of the aniline in the preparation of the initial N,N-diethyl N'-phenyl-ethylenediamine.

The corresponding compound, substituted with ethoxy (—OC₂H₅) in the position β' of R₁, can be obtained by using β'-ethoxy-α-bromopyridine, in place of α-bromo-pyridine.

The corresponding β-pyridine compounds can be obtained similarly by reacting with β-bromopyridine instead of α-bromopyridine.

By starting from the N,N-dimethyl N'-phenyl-ethylenediamine instead of from the N,N-diethyl compound, the corresponding product of the formula

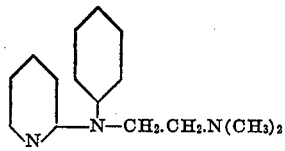

is obtained.

EXAMPLE 3

2.5 g. α-(dimethylaminoethyl-amino)pyridine of boiling point 132–138° C./13 mm. and 0.63 g. sodamide were suspended in 45 cc. dry toluene. After heating to 50° C. 2 g. isopropylbromide were added slowly, and the mixture refluxed for 12 hours. Worked up as Example 1, a yellow oil of boiling point 120–125° C./1 mm. was obtained, corresponding to the formula:

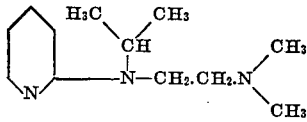

A readily water-soluble mono-hydrochloride of this base may be prepared with the aid of hydrogen chloride.

EXAMPLE 4

11.1 g. α-amino β-picoline and 2 g. sodamide were heated in 170 cc. dry xylene to 100° C. and 5.4 g. dimethyl-aminoethylchloride were added slowly. After refluxing for 18 hours, the mixture was worked up as mentioned in Example 1. The fraction of boiling point 125–144° C./13 mm. was a yellow oil, corresponding to the formula:

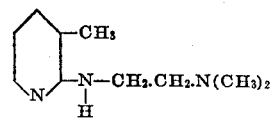

This was condensed with benzylchloride as described in Example 1. The fraction of boiling point 150–188° C./14 mm. represented a heavy yellow oil, corresponding to the formula:

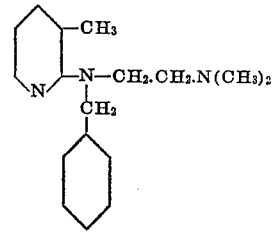

The di-hydrobromide formed white hygroscopic crystals.

The corresponding α-amino-α'-picoline compounds can be obtained in similar manner.

EXAMPLE 5

2.77 g. α-(dimethylaminoethylamino) pyridine (of B. P. 131–140° C./13 mm.) and 0.65 g. sodamide were suspended in 40 cc. dry toluene and heated to 90° C. Then 2.65 g. β-bromopyridine were added slowly, and the mixture refluxed for 22 hours. It was worked up as mentioned in Example 1. The fraction of boiling point 138–143° C./0.04 mm. represented a yellow oil of very disagreeable odor, corresponding to the formula:

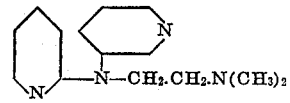

The di-hydrochloride formed from this base had a slightly yellow color.

The corresponding α-aminopyridine-α-pyridine compound can be obtained in similar manner.

EXAMPLE 6

12.85 g. of 6-Cl,4-methylpyrimidine and 21.12 g. N,N-dimethyl N'-(p-methyl-benzyl) ethylenediamine were suspended in 150 cc. dry xylene, 4.3 g. sodamide were added and the mixture refluxed for 20 hours. Worked up as Example 1, a yellow heavy oil, was obtained which gave a hygroscopic di-hydrochloride corresponding to the formula:

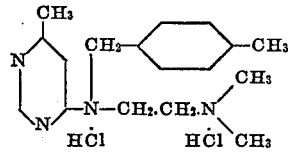

EXAMPLE 7

11.45 g. 3-chloropyridazine and 28.8 g. N,N-dibutyl N'-benzylethylenediamine were suspended in 180 cc. dry toluene, 4.3 g. sodamide were added and the mixture refluxed for 18 hours. Worked up as Example 1, a dark yellow oil was obtained corresponding to the formula:

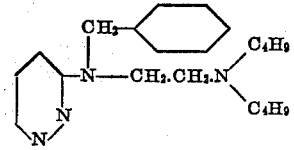

of which the di-phosphate was prepared.

EXAMPLE 8

16.3 g. 2-bromothiophene and 12.8 g. N,N-dimethyl N'-ethyl-ethylenediamine and 14.2 g. $P_2O_5$ were refluxed for 8 hours in 150 cc. dry ethanol. The mixture was evaporated to dryness, the residue taken up with water, made alkaline and extracted with chloroform. Fractionated high vacuum distillation yielded a yellow oil corresponding to the formula:

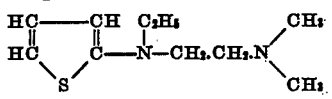

EXAMPLE 9

18.4 g. α-benzylamino pyridine, 19.53 g. β,β-dimethyl-α-diethylaminopropylchloride and 4.6 g. pulverized sodamide were refluxed for 22 hours in 220 cc. dry pyridine. Worked up as Example 1, a viscous yellow oil is obtained, the sulfate of which corresponded to the formula:

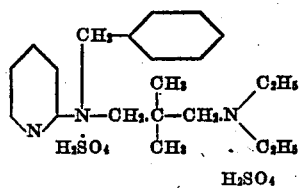

The corresponding compound, substituted in $R_3$ with a side chain of 4 C-atoms, can be obtained by reacting benzylaminopyridine with α-diethylamino, γ-aminobutylchloride:

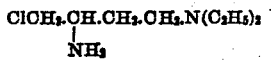

EXAMPLE 10

17 g. β-phenylamino-pyridine, 16.5 g. diethylaminopropyl chloride and 4.3 g. pulverized sodamide were refluxed for 20 hours in 250 cc. cymene. Worked up as Example 1, a yellowish oil was obtained, corresponding to the formula:

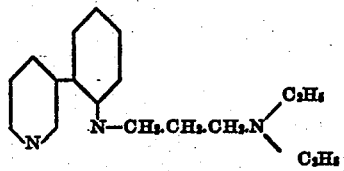

The corresponding lactate was found to be water-soluble.

EXAMPLE 11

17.9 g. 2-(dimethylaminoethylamino)-6-methyl pyridine, 16.44 g. piperidine-ethyl-chloride and 9 g. sodium acetate are refluxed for 23 hours in 220 cc. dry toluene. The reaction mixture is worked up as in Example 1. A viscous yellow oil is obtained which corresponds to the formula:

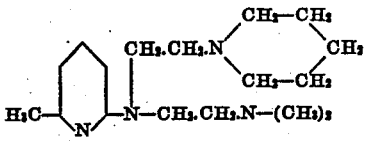

and which forms with tartaric acid a white crystalline tartrate.

EXAMPLE 12

19.4 g. 2-(diethylaminoethylamino) pyrimidine, 17.21 g. anisyl chloride, and 4.6 g. powdered sodamide are refluxed for 23 hours in 230 cc. dry toluene. The reaction mixture is worked up as in Example 1. A viscous yellow oil is obtained corresponding to the formula:

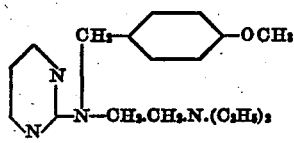

The oily base forms with salicylic acid a white crystalline salicylate.

Having thus described the invention, what is claimed is:

1. An anti-histaminically active tertiary amine of the formula

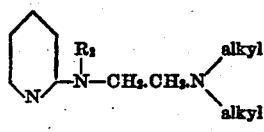

wherein $R_2$ stands for aralkyl, and its salts.

2. The anti-histaminically active tertiary amine of the formula

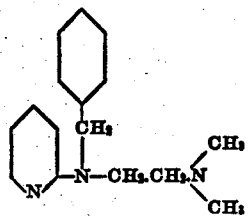

and its salts.

CARL DJERASSI.
CHARLES P. HUTTRER.
CAESAR R. SCHOLZ.